Figure 1:
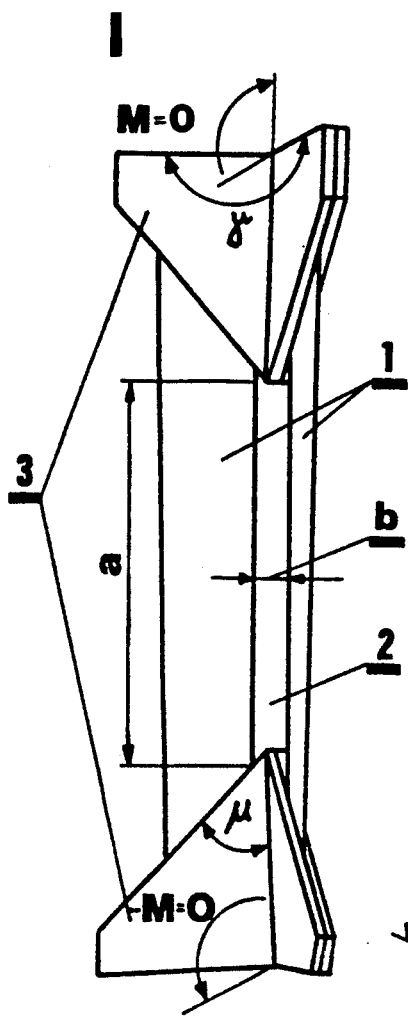

United States Patent [19]

Frackiewicz

[11] Patent Number: 5,080,333
[45] Date of Patent: Jan. 14, 1992

[54] SPRING WITH TWO STATES OF STABLE EQUILIBRIUM

[75] Inventor: Henryk Frackiewicz, Warsaw, Poland

[73] Assignee: Polska Akademia Nauk - Institut Podstawowych Problemow Techniki, Warsaw, Poland

[21] Appl. No.: 482,076

[22] Filed: Feb. 16, 1990

[51] Int. Cl.⁵ .............................................. F16F 1/00
[52] U.S. Cl. ................................................... 267/182
[58] Field of Search ........................ 267/158-165, 267/182, 181, 180, 69, 283, 67

[56] References Cited

U.S. PATENT DOCUMENTS

| | | | |
|---|---|---|---|
| 1,037,729 | 9/1912 | Collins | 267/165 |
| 1,117,892 | 11/1914 | Norris | 267/163 |
| 1,156,859 | 10/1915 | Hamilton | 267/165 |
| 2,009,496 | 7/1935 | Johnson | 267/181 X |
| 2,658,972 | 11/1953 | Brown | 267/159 X |
| 2,825,449 | 3/1958 | Britt et al. | 267/163 X |
| 3,013,764 | 12/1961 | Kuhn | 267/165 X |
| 3,272,492 | 9/1966 | Jones | 267/273 X |
| 3,459,292 | 8/1969 | Piroutek | 267/158 X |
| 3,737,155 | 6/1973 | Karlan | 267/165 X |
| 4,206,808 | 6/1980 | Kreff | 267/164 X |
| 4,572,471 | 2/1986 | Schrepfer | 267/158 X |
| 4,695,677 | 9/1987 | Ruth et al. | 267/158 X |

FOREIGN PATENT DOCUMENTS 21617 7/1961 Fed. Rep. of Germany ...... 267/165
129927 9/1982 Poland .

Primary Examiner—Douglas C. Butler

[57] ABSTRACT

This invention relates to a spring two states of stable equilibrium. This spring is to be used for accumulation of elastic strain energy and for setting the mutual position of movable co-acting parts. The spring consists of at least one pair of elastic strips and two shaped elements determined by the angles, the elastic strips of each pair being connected to one another, preferably at their ends, with arms of the shaped elements in such a way that between the neighboring sides of the strips there is a slot of length and a variable width. Strips are situated in relation to one another in such a way that they are inclined at an angle as determined by the inclination angle of shaped elements. The invention is applicable for clamping various parts, for instance, for closing kinematic chains, for accumulation of elastic strain energy in bumpers, as well as for ensuring the state of equilibrium of component parts of various mechanisms.

6 Claims, 2 Drawing Sheets

SPRING WITH TWO STATES OF STABLE EQUILIBRIUM

This invention relates to a two-positional spring having two states of stable equilibrium with regulated positions, applicable for control of mutual positioning of movable co-acting parts and for accumulation of elastic strain energy.

The spring can be used for clamping various components, for closing kinematic chains, for permanent accumulation of elastic strain energy in bumpers, as well as for ensuring two equilibrium positions in mechanisms of various kinds.

Those skilled in art know springs having the shape of rods, plates and spirally and helically coiled wires, as well as strips of various shapes. They has very diversified characteristics depending upon the kind of the material being used and upon their initial form.

From the Polish Patent Specification No. 129927, for instance, a spring with a non-linear characteristic is known. The essential component parts of the said spring are two horizontal elements, situated perpendicularly to the direction of action of the loading force, connected to each other by means of two vertical elements, preliminarily bent aside with respect to each other in opposite directions and perpendicular to the edges of the horizontal elements, wherein said vertical elements have a variable cross section along the length of the element.

A characteristic feature of all springs so far used consists in that for a given external load there exists one and only one deformation of the spring which corresponds to its state of equilibrium. This means that the characteristic curve of the spring which describes the relationship between the external load and the deformability parameter is a single-valued function. In the case of use of the existing springs achievement of two states of equilibrium for the same external load required application of systems which include at least one additional element besides the spring.

The springs used heretofore can accumulate elastic strain energy only, when they are subjected to the action of some external load and when the external load no longer exists then the elastic strain energy is being converted in another kind of energy.

The aim of this invention is to develop the design of a spring with controllable states of equilibrium of parts set in motion within a definite range of the motion.

According to the invention the spring consists of at least two elastic elements. The angle $\gamma$ of mutual inclination of cross-sections of the elastic elements is constant or it varies along the longitudinal axis. The ends of elastic elements are fastened into the connecting elements in such a manner that a slot is formed along the axis of the spring.

The elastic elements are flat in their non-deformed state. This means that at least one main curvature of the surface of the elastic element is equal zero before it is fastened in its non-deformed state.

By choosing appropriately the properties of the material of the elastic elements, by selecting the shape and properties of the material of the connecting elements and by fixing appropriately the elastic elements in the connecting elements, various structural solutions of the spring being the subject of the invention can be obtained. The considerable variety of the thus obtained spring solutions is accompanied by an even greater variety of characteristics describing the relationship between the external loads of the spring and the parameter which expresses its deformation. Proper selection of geometrical and elastic parameters of the spring makes it possible, however, to always obtain a non-univalued characteristic curve corresponding to a spring with at least two states of stable equilibrium. Thereby, a structural solution of a spring characterized by the ability of permanent accumulation of elastic strain energy, damping of oscillations or absorption in impact energy can also be obtained.

Figure 2:
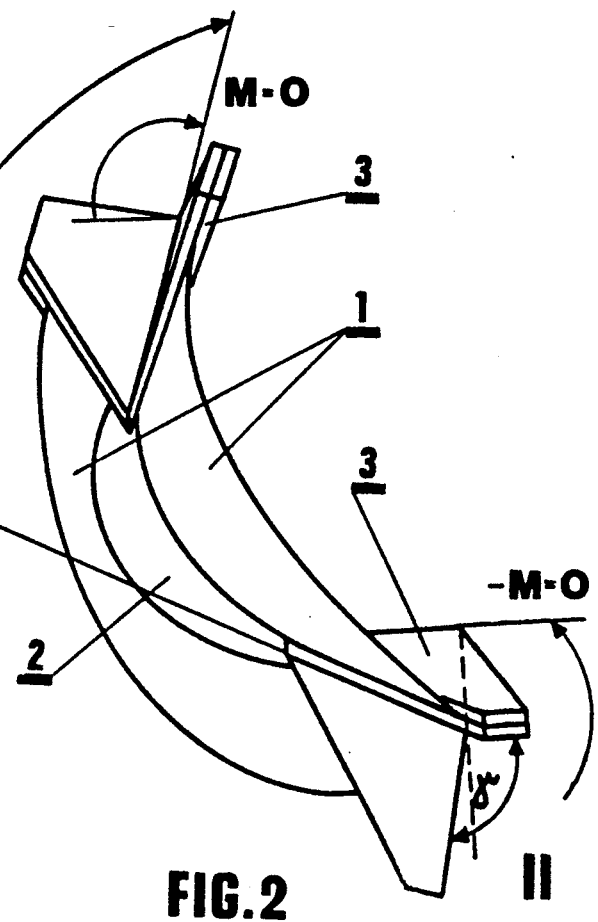
Figure 3:
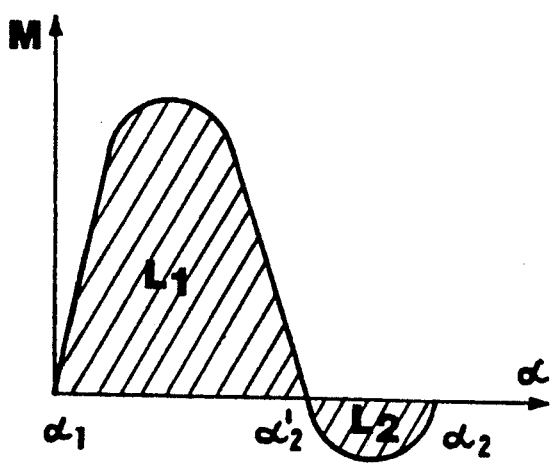
Figure 4:
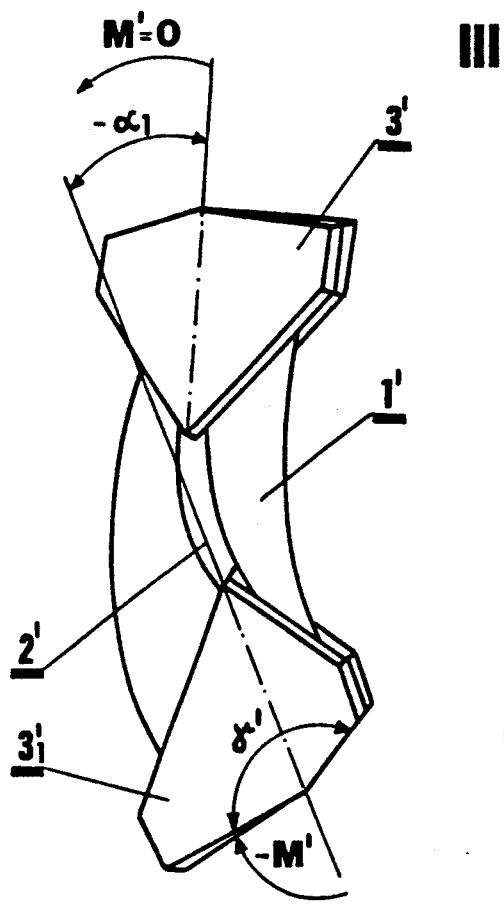
Figure 5:
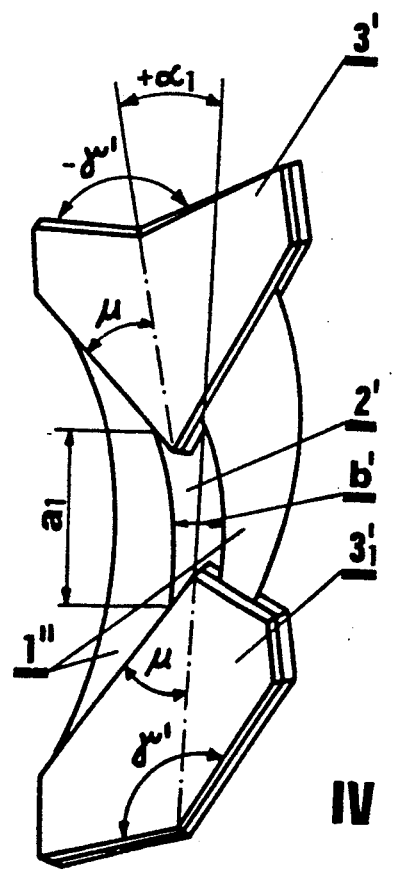
Figure 6:
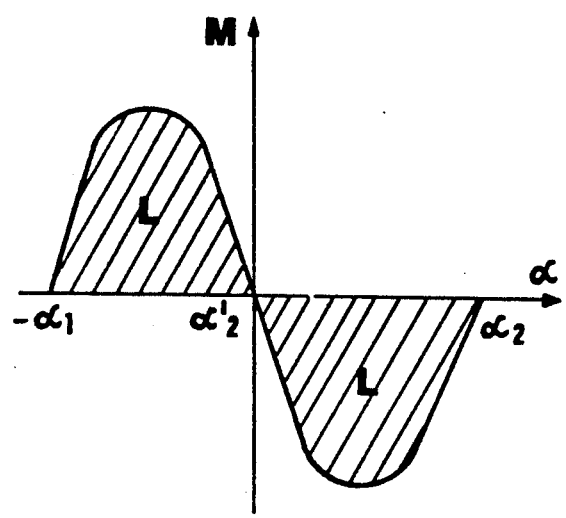

The invention has been visualized on three examples of embodiment shown in the drawings, wherein FIG. 1 and FIG. 2 present a view of a two-positional spring, FIG. 3 presents the curve of characteristics of the spring shown in FIG. 1, FIG. 4 and FIG. 5 present still another example of a two-positional spring shown in a view, FIG. 6 presents the curve of characteristics of the spring according to FIG. 4, FIGS. 7 and 8 visualize a subsequent example of the two-positional spring shown in a view, and finally, FIG. 9 presents the characteristic curve of the spring according to FIG. 7.

EXAMPLE I

The two-positional spring as shown in the drawing of FIGS. 1 and 2 consists of two elastic elements 1, which are flat in their non-deformed state, and of two connecting angle-shaped elements 3. Every connecting element 3 is composed of two identical layers. Each layer of the connecting element 3 constitutes a bent segment of a metal sheet such that the cross-section takes the shape of letter "V" with the angle between arms equal $\gamma$. the elastic elements 1 are inclined to each other at the angle $\gamma$ of the inclination of the arms of connecting elements, 3. The ends of the elastic elements are fixed between the layers of the connecting element 3 with screws. The layers mentioned may be joined by welding or soldering.

The pressing edges of the connecting elements form the angle $\mu$ with the edges of bending of these elements. Between the adjacent sides 4 of the elastic elements 1, along the longitudinal axis, the slot 2 is formed having length a and width b, depending upon the parameters and characteristics of the spring. The elastic elements 1 are not deformed prior to their fixing in the arms of the connecting elements 3 (See FIG. 1).

The functioning of the spring is as follows: The spring is loaded with the oppositely directed moments of magnitude M, acting in the symmetry planes of the connecting elements 3. The spring can be deflected from position I of FIG. 1 by application of moments $M>0$ to $M<0$. When moments M change, the deformation of the spring, expressed through the value of the angle $\alpha$, changes as well (FIG. 2). The dependence between the moment M and the angle $\alpha$ is shown in the characteristics of FIG. 3. The shape of the characteristic curve implies that for $\alpha=\alpha_1$, $\alpha=\alpha'_2$ and $\alpha=\alpha_2$ moments M are equal zero, with $\alpha'_2$ corresponding to unstable equilibrium, and $\alpha_1$, $\alpha_2$ corresponding to two states of stable equilibrium. Hence, the spring has two positions of stable equilibrium.

The characteristics of the spring which describes the relationship between the moment and the deformation /FIG. 3/ depends upon geometrical parameters of the spring and its material's constants.

Experimental or theoretical selection of those parameters ensures establishing of such a relation between the energy of compression and tension, bending and twisting of the spring, for which one obtains the states of stable equilibrium in two positions: $\alpha=\alpha_1=0$ and $\alpha=\alpha_2$. The spring as shown in this example of embodiment is characterized by the fact that in the position of the state of equilibrium corresponding to $\alpha=\alpha_2$ it accumulates in a permanent way the amount of elastic strain energy equal to the difference of work $/L_1-L_2/$. Such springs are applicable in structures requiring strong damping of oscillations (e.g. in bumpers) in which the connecting elements 3 may constitute elements of the device.

EXAMPLE II.

The two-positional spring as shown in FIGS. 1 and 5 consists of two elastic elements, 1' and two connecting elements: the first one, 3' and the second one, $3_1$ elements are characterized by the angle $\alpha>180°$. One end of each of the elastic elements, 1', is initially fixed in the first connecting element 3' and then, after the elastic elements 1' are deformed, each of them has its second end fixed in the second connecting element $3_1'$. The spring will then assume the position shown in FIG. 4, which corresponds to the external load $M=0$ and $-M=0$. Between the neighbouring sides 4' of the elastic elements 1' there has been formed a slot 2' of the length a' and the width b'; variable along the longitudinal axis of the spring.

Operation of the spring is as follows. The spring has been loaded with the moment M, analogously as in Example I. The spring can be deflected from the position shown in FIG. 4 by application of a moment $M>0$ or $M<0$. Depending upon the value of the moment M, the elastic elements get deformed and the deflection defined by the angle $\alpha$ changes accordingly (FIG. 5). The shape of this dependence is shown by the characteristic curve of FIG. 6. The curve shown in FIG. 6 implies that for $\alpha=-\alpha_1$, $\alpha=\alpha_2'$ and $\alpha=\alpha_2$ the moments are equal to zero, point $\alpha_2'$ corresponding to an unstable equilibrium, and points $\alpha_1$ and $\alpha_2$ corresponding to a stable equilibrium. Hence, the spring under consideration has two states of stable equilibrium for $\alpha=-\alpha_1$ and for $\alpha=\alpha_2=-\alpha_1$ with the corresponding moments and $-M'=0$.

The characteristic curve of the spring describing the relationship between the moment and the deformation /FIG. 6./ depends upon the geometrical parameters of the spring and its material's constants.

An experimental or theoretical selection of those parameters ensures such a relation between the energy of compression and tension, bending and twisting, for which a stable equilibrium is obtained at two positions and namely $\alpha=-\alpha_1$ and $\alpha=\alpha_2'=-\alpha_1$.

The spring presented in this example is characterized by the fact that in both states of the stable equilibrium it accumulates permanently the same minimum elastic strain energy.

EXAMPLE III.

FIGS. 7 and 8 present a spring with two states of stable equilibrium. This spring consists of two elastic elements 1'' and two connecting elements 3''. The connecting elements 3'' are flat ($\alpha=180°$). The elastic elements 1'' are first fixed at their one end in the first connecting element 3'', and then the appropriately deformed elastic elements 1'' are fixed at their other ends in the second connecting elements 3''.

The spring will assume the position shown in FIG. 7, this position corresponding to external loading with moments $M''=0$. Along the longitudinal axis, between the neighboring sides 4'' of the said elastic elements 1'', the slot 2'' is formed of length a'' and width b'', the width varying along the axis of the spring.

The shape of the said slot 2'' is established depending upon he parameters and characteristics of the spring.

The spring functions in the following manner. It is loaded analogously as in examples I and II. The spring can be deflected from position $v$ (FIG. 7) by application of moments $M>0$ or $M>0$. The elastic elements 1'' get deformed when moments M increase and their deflection, expressed through the value of angle $\alpha$, changes in accordance with the diagram of FIG. 9. The characteristic curve of FIG. 9 shows that for $\alpha=\alpha_1$, $\alpha=\alpha'_2$ and $\alpha=\alpha_2$ the moment M is equal zero, with the point $\alpha'_2$ corresponding to unstable equilibrium, and the points $\alpha_1$, $\alpha_2$ corresponding to two stable equilibria. Hence, the spring has two positions of stable equilibrium: for $\alpha=\alpha_1$ and for $\alpha=\alpha_2=-\alpha_1$, to which moments $M''=0$ correspond.

The characteristic curve of the spring which describes the relationship between the moment the deformation /FIG. 9/ depends upon geometrical parameters of the spring and upon its material's constants.

The spring presented in this example has, similarly as the springs presented in two previous examples, two states of stable equilibrium. A proper choice of parameters, either experimental or theoretical, can ensure the required relation between the energies for which the phenomena of stable equilibrium take place.

I claim:

1. A two-positional spring of the increased vibration damping efficiency having two controllable positions of the stable equilibrium, including elastic elements and connecting elements, said spring having a longitudinal axis and comprising at least two elastic elements (1, 1', 1'') positioned symmetrically relative to the longitudinal axis of said spring, and said elastic elements being permanently connected by said connecting elements (3, 3', and $3_1$, and 3''), said elastic elements (1, 1', 1'') being symmetrically fixed at their ends and forming a slot (2, 2', 2'') along said longitudinal axis of said spring.

2. The spring according to claim 1, wherein said connecting elements (3, 3', and $3_1$, and 3'') are elastic and are composed to two layers which are permanently connected.

3. The spring according to claim 1, wherein the connecting elements (3, 3', and $3_1$, and 3'') are shaped as an angle section having arms inclined at an angle ($\gamma$), less than 180°.

4. The spring according to claim 1, wherein said elastic elements (1, 1', 1'') when fixed, are inclined at an angle ($\gamma$) to said longitudinal axis of said spring.

5. The spring according to claim 1, wherein the elastic elements (1, 1', 1'') have variable cross-section.

6. The spring according to claim 1, wherein the elastic elements (1, 1', 1'') are flat when not deformed.

* * * * *